UNITED STATES PATENT OFFICE.

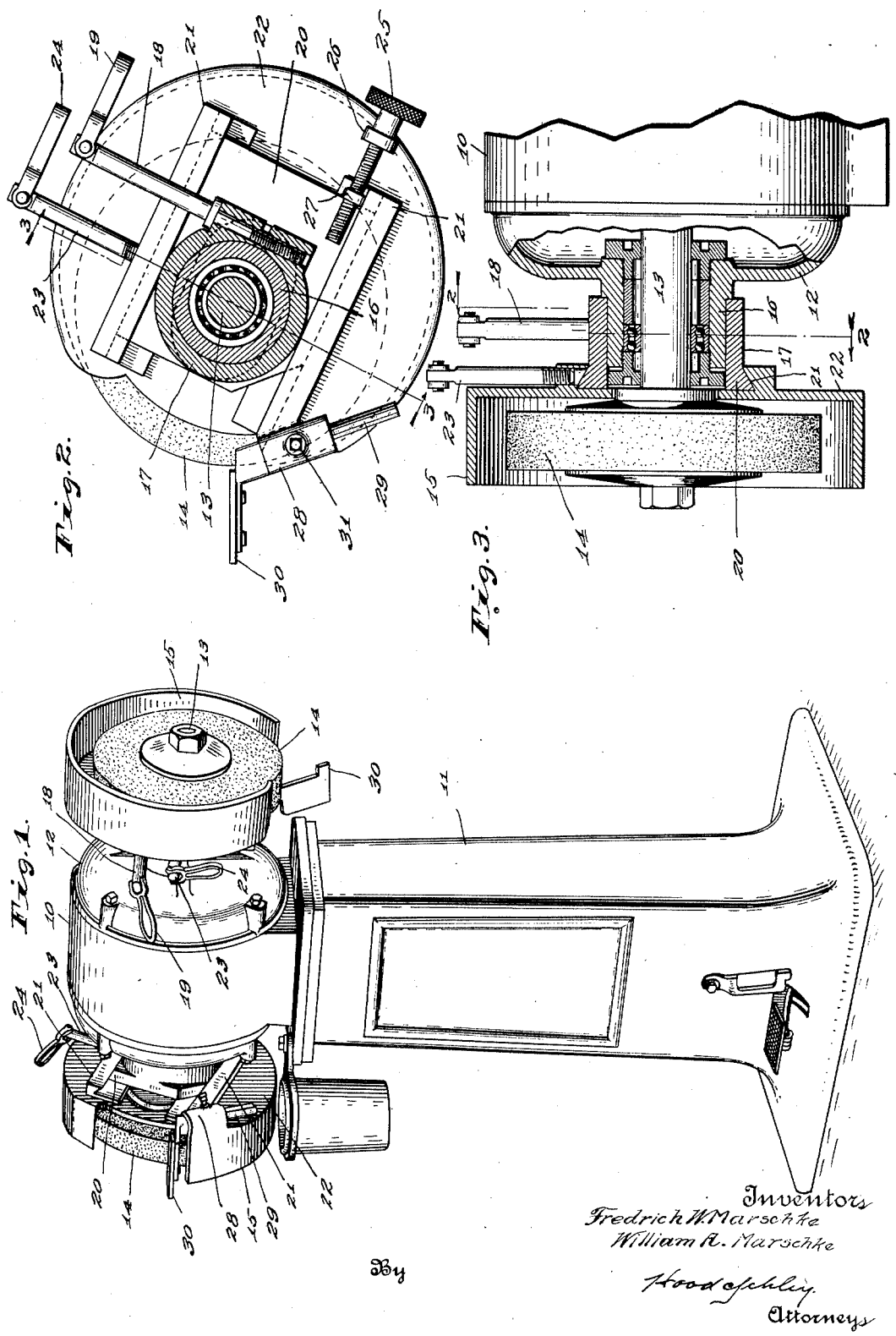

WILLIAM A. MARSCHKE AND FREDRICH W. MARSCHKE, OF INDIANAPOLIS, INDIANA, ASSIGNORS TO MARSCHKE MANUFACTURING COMPANY, OF INDIANAPOLIS, INDIANA, A CORPORATION OF INDIANA.

GRINDER-HOOD.

1,372,033.  Specification of Letters Patent.  Patented Mar. 22, 1921.

Application filed May 17, 1920. Serial No. 382,116.

*To all whom it may concern:*

Be it known that we, WILLIAM A. MARSCHKE and FREDRICH W. MARSCHKE, citizens of the United States, residing at Indianapolis, in the county of Marion and State of Indiana, have invented a new and useful Grinder-Hood, of which the following is a specification.

It is the object of our invention to provide for abrasive wheels a protecting hood having an opening through which the work is applied to the wheel, which hood can be adjusted both circumferentially and diametrically to vary the location of the opening to suit the nature of the work and the size of the wheel; and to mount on the hood near the opening a rest which is adjusted with the hood, but which can be swung out of the way when the nature of the work makes that desirable.

The accompanying drawing illustrates our invention: Figure 1 is a perspective view of a two-wheel grinder, embodying our invention in the hood for each of the wheels; Fig. 2 is a section transverse to the shaft, taken on the line 2—2 of Fig. 3; and Fig. 3 is a section axially of the shaft, taken on the line 3—3 of Fig. 2.

The grinder is shown as having a driving motor 10, usually an electric motor, mounted on any suitable pedestal 11, the motor being provided with end plates 12 which carry suitable bearings for the shaft 13. The shaft 13, however, is not necessarily driven by its own individual motor. On a projecting end of the shaft 13, or on each projecting end in the preferred arrangement shown, is an abrasive wheel 14; when there are two such wheels they may be different, as for rough and finishing grinding respectively.

Associated with each abrasive wheel 14 is an annular protecting hood 15, open at one part of its circumference to allow the work to be brought in contact with the periphery of the wheel. This hood is adjustable both circumferentially and diametrically of the wheel.

For this purpose, the stationary bearing sleeve 16 of the end plate 12 has mounted on its outside a split sleeve 17, which can be clamped on the bearing sleeve 16 in any circumferential position desired, or released to permit circumferential adjustment of such split sleeve, by a clamping screw 18, which preferably has a swinging operating handle 19. The split sleeve 17 has a fixed flange forming a slide plate 20 perpendicular to the shaft 13, and opposite parallel edges of this slide plate 20 are beveled to coöperate with undercut slide ways 21 mounted on the supporting end-plate 22 of the hood 15. A clamping screw 23 mounted in one of the slide ways 21 operates against the edge of the slide plate 20 to clamp the hood 15 in any desired position in which it may be adjusted along such slide plate. The clamping screw 23 also preferably has a swinging operating handle 24. For convenience in shifting the hood, an adjusting screw 25 acts between lugs 26 and 27 fixed on the end plate 22 and the slide plate 20 respectively, one of such lugs, as shown the lug 27, being internally threaded to receive the screw 25.

The end plate 22 carries a socket 28 to receive the stem 29 of a work rest 30. The socket 28 and stem 29 are offset from the plane of the wheel 14, so that the rest may be swung either into working position, as shown in Fig. 2 and at the left of Fig. 1, and clamped there by a set screw 31, or out of working position to give freer access to the opening in the hood 15 for certain kinds of work, as shown at the right in Fig. 1.

By loosening the clamping screw 18, the hood may be adjusted circumferentially about the shaft 13, to bring the opening of the hood to any desired position, two positions being illustrated in Fig. 1 for the two wheels. The adjustment shown at the right of Fig. 1 permits the grinding of large pieces which can only be brought against the wheel 14 at the bottom. This circumferential adjustment about the shaft 13 is made without affecting the distance separating the wheel and the hood at the edges of the opening of the latter. As the wheel 14 wears down, or when a wheel of different size is mounted on the shaft 13, the hood may be adjusted diametrically in the radial line of the center of the work-admitting opening to suit the change in wheel size, by loosening the clamping screw 23, and operating the adjusting screw 25 to produce the proper movement. By making this diametrical adjustment on this radial line the two edges of the opening are always spaced about the same distance from the wheel.

We claim as our invention:

1. In a grinder, the combination of a driving shaft adapted to receive an abrasive wheel, a supporting sleeve co-axial with said shaft, a second sleeve circumferentially adjustable on the first sleeve, and a wheel hood mounted on said second sleeve and provided with an opening through which access to the wheel is given, the mounting of said hood on said second sleeve comprising a pair of straight, parallel, undercut portions on one of said members engaging straight mating edges on a part on the other of said members.

2. In a grinder, the combination of a driving shaft adapted to receive an abrasive wheel, a supporting sleeve co-axial with said shaft, a second sleeve circumferentially adjustable on the first sleeve, a wheel hood carried by said second sleeve and provided with an opening through which access to the wheel is given, said hood being diametrically adjustable on said second sleeve, a screw for producing said last-named adjustment, and means for clamping said hood in any position to which it is moved by said screw.

3. In a grinder, the combination of a driving shaft adapted to receive an abrasive wheel, a supporting sleeve co-axial with said shaft, a second sleeve circumferentially adjustable on the first sleeve, a wheel hood carried by said second sleeve and provided with an opening through which access to the wheel is given, said hood being adjustable on said second sleeve transversely of the shaft in the radial line of said opening, and a screw for producing said last-named adjustment.

4. In a grinder, a combination of a driving shaft adapted to receive an abrasive wheel, a supporting sleeve co-axial with said shaft, a second sleeve circumferentially adjustable on the first sleeve, a wheel hood mounted on said second sleeve and provided with an opening through which access to the wheel is given, and a work rest mounted on said hood at one side of the plane of the wheel so that it can be swung into and out of working position.

5. In a grinder, the combination of a driving shaft adapted to receive an abrasive wheel, a supporting sleeve co-axial with said shaft, a second sleeve circumferentially adjustable on the first sleeve, a wheel hood mounted on said second sleeve and provided with an opening through which access to the wheel is given, and a work rest mounted on said hood.

6. In a grinder, the combination of a driving shaft adapted to receive an abrasive wheel, a supporting sleeve co-axial with said shaft, a split sleeve mounted on said supporting sleeve and provided with means for clamping in thereon, in different circumferential adjustments, said split sleeve having a slide plate, and a wheel hood having a sliding mounting on said slide plate substantially diametrically of the wheel, said hood having an opening in the line of its sliding adjustment to give access to the wheel.

In witness whereof, we have hereunto set our hands at Indianapolis, Indiana, this 5th day of May, A. D. one thousand nine hundred and twenty.

WILLIAM A. MARSCHKE.
FREDRICH W. MARSCHKE.